(12) United States Patent
Taira et al.

(10) Patent No.: US 7,345,654 B2
(45) Date of Patent: Mar. 18, 2008

(54) THREE-DIMENSIONAL IMAGE DISPLAY APPARATUS

(75) Inventors: Kazuki Taira, Tokyo (JP); Yuzo Hirayama, Kanagawa-ken (JP); Tatsuo Saishu, Tokyo (JP); Rieko Fukushima, Tokyo (JP); Ayako Takagi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/712,439

(22) Filed: Mar. 1, 2007

(65) Prior Publication Data

US 2007/0146234 A1  Jun. 28, 2007

Related U.S. Application Data

(63) Continuation of application No. 10/772,302, filed on Feb. 6, 2004, now Pat. No. 7,250,923.

(30) Foreign Application Priority Data

Feb. 6, 2003 (JP) ............................... 2003-29281

(51) Int. Cl.
*G02B 5/30* (2006.01)

(52) U.S. Cl. ..................... 345/6; 345/4; 345/5; 345/32; 345/38; 349/57; 349/181; 353/20; 353/34; 359/494; 359/495

(58) Field of Classification Search ................ 345/4, 345/5, 6, 32, 38; 349/57, 64, 181; 353/20, 353/30, 34; 359/494, 495
See application file for complete search history.

(56) References Cited

U.S. PATENT DOCUMENTS 3,501,219 A * 3/1970 Caulfield ..................... 359/256
5,682,214 A * 10/1997 Amako et al. ................. 349/74
6,304,381 B1 * 10/2001 Hayashi ...................... 359/495

FOREIGN PATENT DOCUMENTS

JP  2000-102038  4/2000

(Continued)

OTHER PUBLICATIONS

Notification of Reasons for Refusal issued by the Japanese Patent Office on Jan. 5, 2007, for Japanese Patent Application No. 2004-024128, and English-language translation thereof.

(Continued)

*Primary Examiner*—Bipin Shalwala
*Assistant Examiner*—Vincent E. Kovalick
(74) *Attorney, Agent, or Firm*—Finnegan, Henderson, Farabow, Garrett & Dunner, L.L.P.

(57) ABSTRACT

A three-dimensional image display apparatus includes an image display configured to output image light which arrays a plurality of pixels and has polarization, a lens array arranged in front of the image display, configured to function as lens at light which has a 1st polarization direction, and not to function as lens at light which has a 2nd polarization direction differed from the 1st polarization direction, and a birefringent phase modulator placed between the image display and the lens array and configured to rotate a polarization plane of the image light.

22 Claims, 18 Drawing Sheets

FOREIGN PATENT DOCUMENTS

| | | |
|---|---|---|
| JP | 2000-305045 | 11/2000 |
| WO | WO 03/015424 A2 | 2/2003 |

OTHER PUBLICATIONS

Woodgate et al., LP-1: Late-News Poster: "High Efficiency Reconfigurable 2D/3D Autostereoscopic Display," SID '03 Digest (2003), pp. 394-397.

Nose et al., "A Liquid Crystal Microlens Obtained with a Non-Uniform Electric Field," Liquid Crystals (1989), 5:1425-33.

Sato et al., "Variable-focus Liquid-Crystal Fresnel Lens," Japanese Journal of Applied Physics (1985), 24:L626-L628.

Kowel et al., "Focusing by Electrical Modulation of Refraction in a Liquid Crystal Cell," Applied Optics (1984), 23:278-289.

Sato, "Liquid-Crystal Lens-Cells with Variable Focal Length," Japanese Journal of Applied Physics (1979), 18:1679-84.

* cited by examiner

Fig.8

| | Two-dimensional image display mode 40 | Two-dimensional image / three-dimensional image change display mode 41 | |
| --- | --- | --- | --- |
| | | At the time of the two-dimensional image display 42 | At the time of the three-dimensional image display 43 |
| Applying voltage unit 21 | OFF (uncertainty) | +V (2nd phase axis direction 23) | —V (1st phase axis direction 22) |
| Output linearly polarization 24 | uncertainty | $\theta = 90°$ | $\theta = 0°$ |
| Applying voltage unit 7 | OFF (Non-lens effect) | ON (Lens effect at polarization direction x-axis: $\theta = 0°$ ) | |
| Output linearly polarization 14 | uncertainty | $\theta = 90°$ (polarization direction 13) Non-lens effect | $\theta = 0°$ (polarization direction 12) Lens effect |

… (1984) p. 278-289. A method of using a refractive index profile lens which gives modulation of refractive index to an inside of a plane of incidence and a propagation direction of light has been disclosed in T. Nose et al., Liquid Crystals Vol. 5, NO. 5, (1989) p. 1425-1433.

THREE-DIMENSIONAL IMAGE DISPLAY APPARATUS

CROSS REFERENCE TO RELATED APPLICATION

This is a continuation of application Ser. No. 10/772,302, filed Feb. 6, 2004, now U.S. Pat. No. 7,250,923, which is incorporated herein by reference.

This application is based upon and claims the benefit of priority from the prior Japanese Patent Application No. JP2003-029281 filed on Feb. 6, 2003, of which the entire contents are incorporated herein by reference.

FIELD OF THE INVENTION

The present invention relates to an autostereoscopic three-dimensional image display, and more particularly, relates to an autostereoscopic three-dimensional image display capable of displaying a two-dimensional image and three-dimensional image.

DESCRIPTION OF THE BACKGROUND

A technique of synthetically displaying images from a plurality of directions using an image display surface, and making the image appear three-dimensional according to a viewpoint of an observer is proposed as a three-dimensional display system using a two-dimensional plane display.

As the three-dimensional display system, existing techniques may use a binocular stereoscopic system which displays two images observed in viewpoints of right and left eyes, and a multi-view system which displays many images observed in a plurality of viewpoints. Moreover, there exists an Integral Photography method (IP method) which synthetically displays images in an image display surface to many directions, without respect to a particular viewpoint.

As a method to select the image, a method using a pinhole array or a slit array having masked parts and aperture parts, and a method arranging a lens array or a lenticular array on the image display surface, and making an image-formation position of a lens a pixel position, are known. It is more desirable to use the lens array since display brightness is reduced using techniques relying on masked parts.

In order to display the two-dimensional image and the three-dimensional image alternatively on a same display, various proposals of techniques for have been made. One method using a lens array utilizes a selection display technique switching an existence of a lens effect by making the lens into a refractive index variable layer, has been previously disclosed, for example, in Japan Patent Application KOKAI No. 2000-102038. Here, it is said that a liquid crystal lens which is controlled by an alignment of liquid crystal by voltage, as a refractive index control means. By switching the existence of a lens effect, in case the two-dimensional image is displayed, it becomes possible to display an image in the original resolution of the two-dimensional display.

Moreover, as a realization method of a liquid crystal lens, a method of enclosing liquid crystal material between a convex or a concave lens and a substrate has been disclosed in S. Sato, J. J. App. Phys. Vol. 18, NO. 9, (1979) p. 1679-1684. A method of using a Fresnel-lens has been disclosed in S. Sato et al., J. J. App. Phys. Vol. 24, NO. 8, (1985) p. L626-L628. A method of using a diffractive lens which gives modulation of refractive index to an inside of a plane of incidence has been disclosed in S. T. Kowel et al.,

SUMMARY OF THE INVENTION

According to embodiments of the present invention, a three-dimensional image display apparatus includes an image display having a plurality of pixels arranged in an array, wherein the image display is configured to provide image light having a polarization, a lens array arranged in front of the image display, configured to function as lens for light having a first polarization direction, and not function as a lens for light having a polarization direction perpendicular to the first polarization direction, and a birefringent phase modulator placed between the image display and the lens array, wherein the birefringent phase modulator is configured rotate a polarization plane of the image light.

BRIEF DESCRIPTION OF THE DRAWINGS

FIG. 8 shows a relation between a display mode, and states of applied voltage and polarization;

DETAILED DESCRIPTION

An autostereoscopic three-dimensional image display apparatus consistent with embodiments of the present invention will be described below in detail with references to the accompanying drawings. Wherever possible, the same reference numbers will be used throughout the drawings to refer to the same or like parts.

In addition, in the applicable drawings, a z-axis is a direction of an observer from a display, an x-axis is a horizontal direction (right and left), and a y-axis is a vertical direction (upper and lower), within a screen of a display.

First Embodiment

Figure 1:
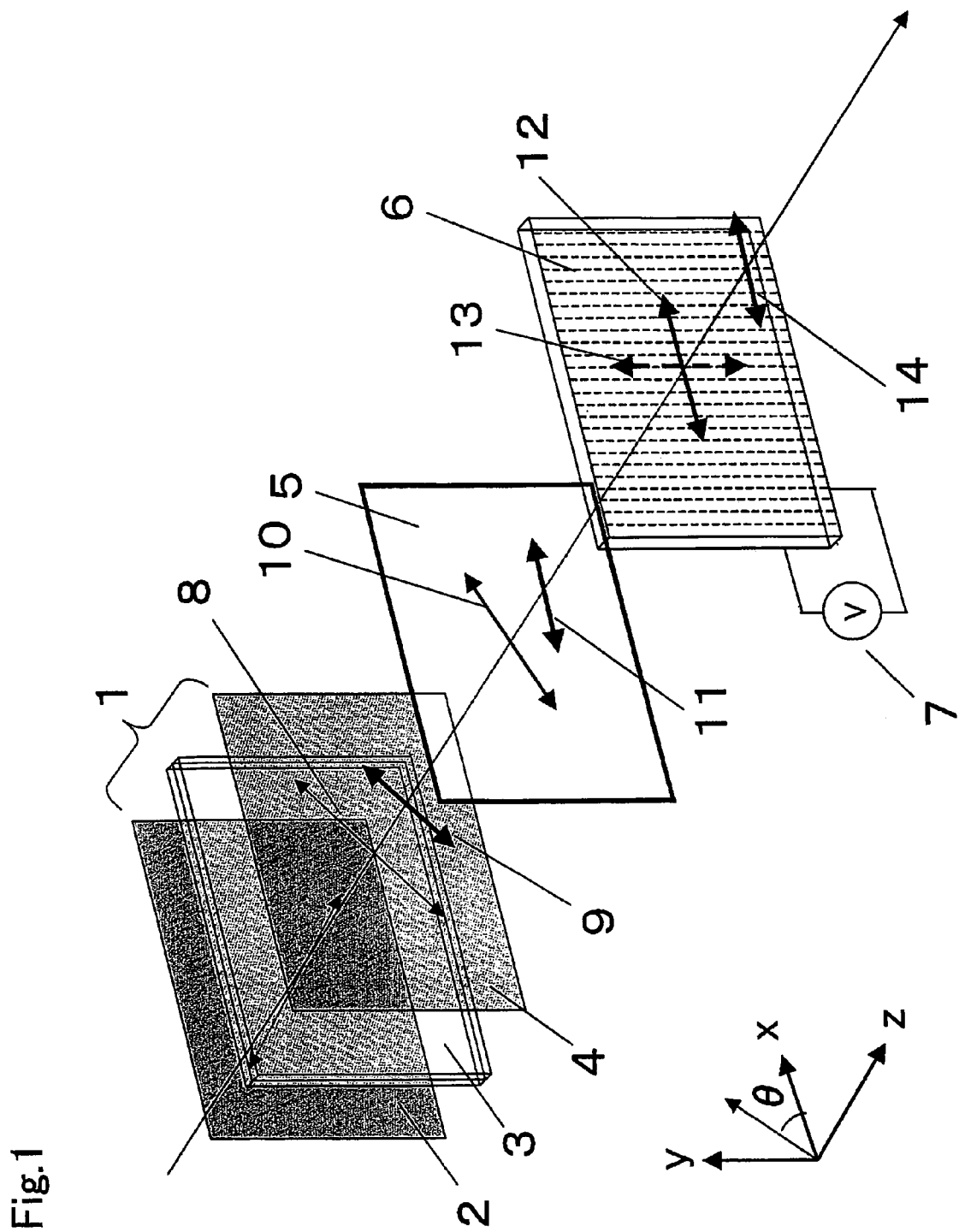
FIG. 1 shows a structure of an autostereoscopic three-dimensional image display apparatus according to the first embodiment of the present invention.

FIG. 1 shows an autostereoscopic three-dimensional image display apparatus according to the first embodiment in present invention.

The autostereoscopic three-dimensional image display may use a Liquid Crystal Display (LCD) 1 as a image display, a birefringent lens array 6 which may have a lenticular effect using a lens pitch almost equal to an integral multiple of a pixel spacings found in LCD 1, and may also use a half-wave film 5 having a passively modulated retardation. As used herein, light projecting from the image display to the lens array is called an image light. The image display may use a spontaneous light emission or it may use a backlight; however, regardless of the method of generation, light emitted from the image display is referred to as image light.

Further referring to FIG. 1, the LCD 1 may have a liquid crystal cell 3, and polarization plates 2, and 4, wherein the liquid crystal cell 3 may be sandwiched between the polarization plates 2 and 4. In the liquid crystal 3, a liquid crystal may be sandwiched between transparent substrates. The LCD 1 may display a three-dimensional or a two-dimensional image.

A backlight (not shown in FIG. 1), may be arranged in back of a polarization plate 2, and a display image may composed by the image light which may be a linear polarized light 9 coincident with a transmissive axis 8 of the polarization plate 4 at light emission side.

The LCD 1 may be a Twisted Nematic (TN) mode, and a direction of the polarization transmissive axis 8 may be θ=45 degrees, in order to keep viewing angle symmetric in a horizontal direction (i.e., the xz-plane).

The half-wave film 5 may be an optical film which comprises heat-resistant transparent resin (e.g., norbornene and/or polycarbonate optical resin) which may have birefringence, may be located at θ=22.5 degrees as a phase axis direction 10 which may be prescribed by a fast axis or a slow axis. The half-wave film 5 may convert an incident linear polarized light 9 to a output polarized light 11 of θ=0 degrees as a polarized direction by a 45 degrees rotation operation.

Further referring to FIG. 1, the birefringent lens array 6 may be a liquid crystal lens array using the liquid crystal cell aligned with the liquid crystal material which may have a positive dielectric anisotropy and may be inserted between parallel transparent substrates in homogeneous alignment. That is, the birefringent lens array 6 may generate a spatial distribution with an alignment-state of liquid crystal by applying voltage to comb-like electrodes arranged in the liquid crystal cell by an applying voltage unit 7, and result in a lens effect. In an alignment direction of the liquid crystal, a direction of a molecule long-chain axis (director) may be θ=0 degrees, the longitudinal direction of the comb-like electrodes may be in the direction of the y-axis, and may be arranged in the direction of the x-axis in the predetermined pitch. Therefore, an electric field distribution becomes symmetrical to a yz-plane between the comb-like electrodes, and a molecule axis of the liquid crystal may have a spatial distribution associated to a xz-plane, maintaining θ at 0 degrees.

Consequently, a lenticular effect may occur to an incident polarization direction 12 of the θ=0 degree at the time of applying a voltage. That is, a lens effect occurs to the incident polarization direction 12 may be equivalent to a case of which it arranges a lenticular array which may have a ridgeline in a direction of a y-axis, and may have a predetermined pitch in a direction of an x-axis. When the voltage is not applied, since the spatial distribution of liquid crystal alignment may be lost, a lens effect does not occur.

On the other hand, to an incident polarization direction 13 of θ=90 degree, a lens effect may not be applicable because the refractive index in the direction may correspond to an ordinary refractive index independent of alignment-state of the liquid crystal.

Figure 2:
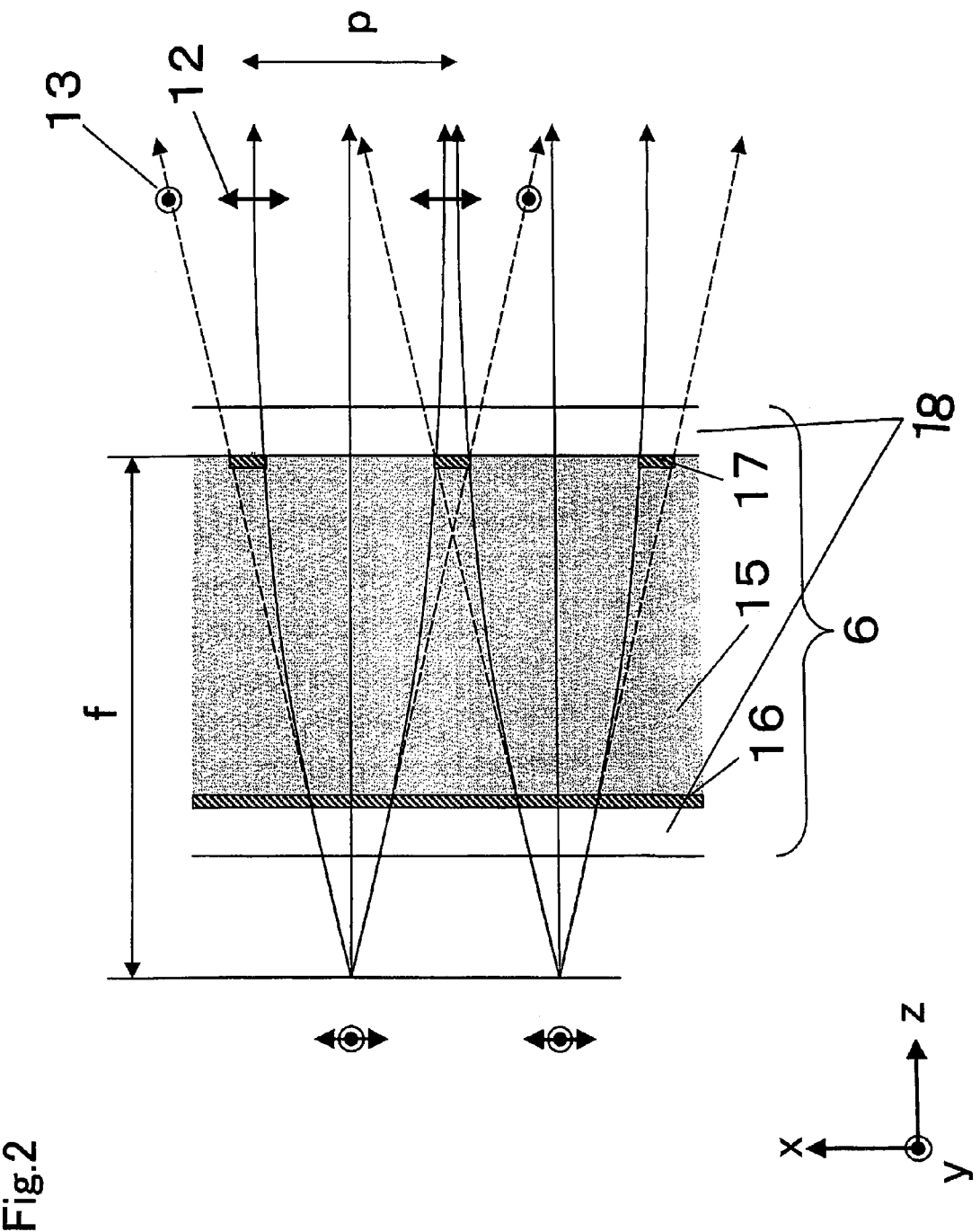
FIG. 2 is a sectional view explaining a structure of a liquid crystal lens and lens effect.

FIG. 2 shows a sectional view for explaining a structure of a liquid crystal lens and lens effect, and provides details about the structure of the lens array 6 and the condensing effect in the liquid crystal.

A common transparent electrode 16 and a set of comb-like electrodes 17 may be respectively arranged in parallel transparent substrates 18. A TN mode liquid crystal 15 may be inserted between the transparent substrates 18.

Here, in an applying voltage method, there is a case where alternating voltage may be applied by using electrodes 16 and 17 as two terminals, and a case which alternating voltage is applied by using the electrodes 16, a group in every even lines and a group in every odd lines of the comb-like electrode 17 as three terminals.

In any case, the spatial distribution of an electric field may be generated by applying voltage between both the electrodes 16 and 17, and the lens effect which may have pitch p and a focal length f, occurs to the polarized component which may have the polarization direction 12. Therefore, a locus of the linear polarized light which may be the polarization direction 12 can be bent in the propagation within the lens array 6.

As stated above concerning the alignment-state of the liquid crystal layer 15, it does not have a lens effect to the polarized component 13 which may be perpendicular to the polarized component 12 regardless of the state of applied voltage because the direction of a molecule long-chain axis may change only in the xz-plane. Therefore, the polarized component 13 may propagate in a straight manner within the lens array 6.

In addition, although the dielectric layer, alignment films, etc. for properly controlling an electric field distribution may be arranged between an electrode and a liquid crystal interface in fact, the illustration abbreviates in FIG. 2.

Figure 3:
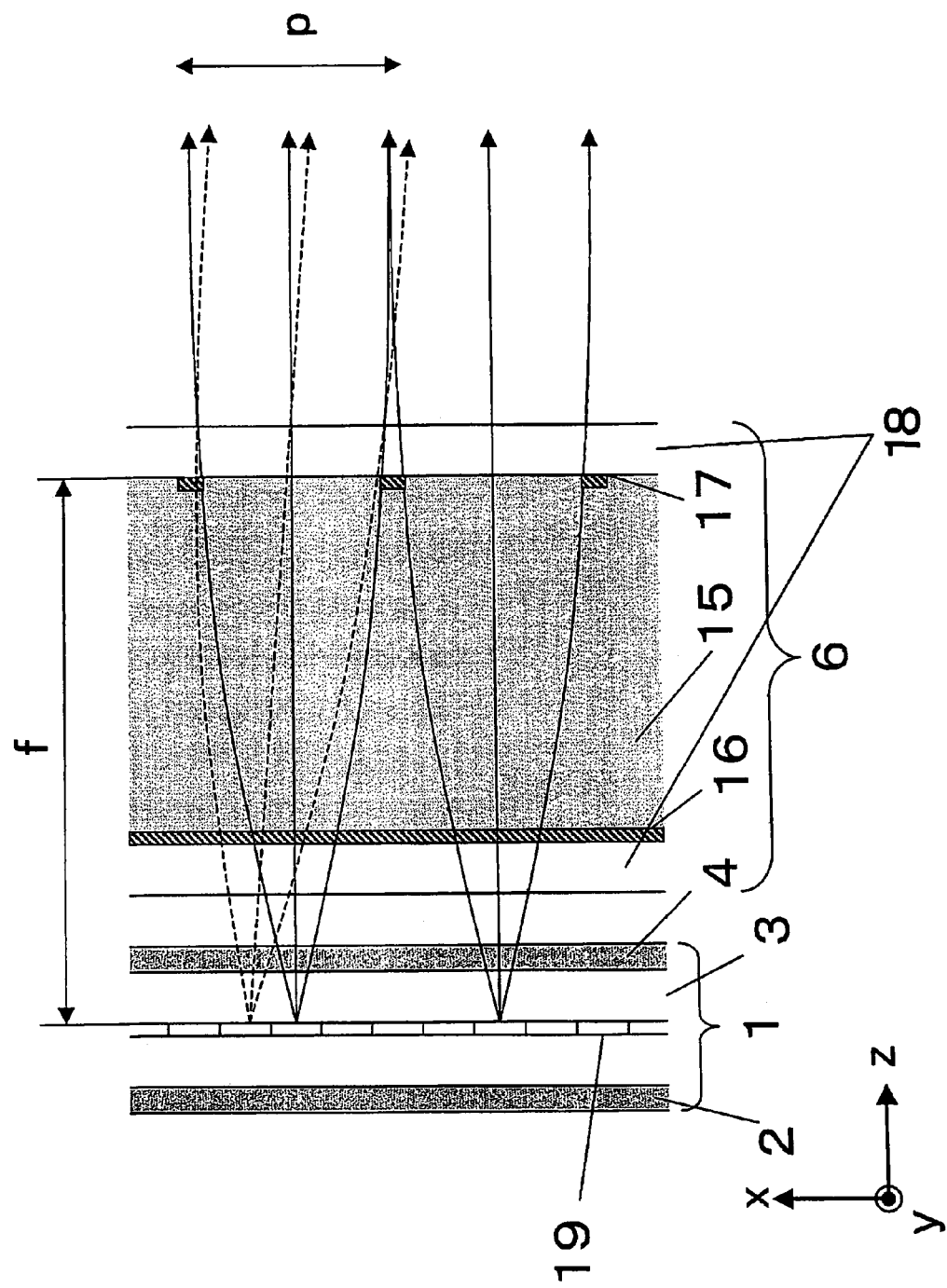
FIG. 3 shows the image-formation characteristics displayed a three-dimensional image with the liquid crystal lens.

Therefore, as shown in FIG. 3, the autostereoscopic three-dimensional image display of lenticular type works to the linear polarized light which has a polarized component in the direction of an x-axis from arranging such a lens array 6 so that the pixel 19 of the LCD 1 may be located in a focal length f.

As explained above, in FIG. 1, the linear polarized light 11 which is image light can be made in correspondence with the polarization direction 12 which may be an effective component of a lens effect which is generated in the lens array 6 by polarization rotation effect of the half-wave film 5.

An output linear polarized light 14, which may have a polarization direction of θ=0 degrees at the lens array 6, can be transmitted with concentration or without concentration by applying or not applying a voltage provided by the applying voltage unit 7. Therefore, the display change between the three-dimensional image and a 2-dimensional image which has a maximum resolution of the LCD 1 may be attained by switching applying voltage or non-applying voltage of the applying voltage unit 7 synchronized with the selection-state of the three-dimensional image and the 2-dimensional image.

In the case the half-wave film 5 is not used, the polarization direction of an incident image to the lens array 6 may be the linear polarized light 9 which may have θ=45 degrees. Therefore, since the polarized component 13 which may not be an effective component of a lens effect in the lens 6 can be included in an incident polarized component, the cross talk which is a multiplexed image may occur in the case of displaying the three-dimensional image.

On the other hand, the output polarization direction 8 which may have θ=0 degrees in the LCD 1 may not be desirable with respect to viewing angle characteristics of the LCD 1.

In the case of making the polarization direction having a lens effect an angle at θ=45 degrees with inclining the lens array 6, the three-dimensional image may not be displayed because parallax information may occur in a slant angle.

Thus, the half-wave film 5 which may be a passive birefringent phase modulator optimizes display characteristics of the LCD 1, and may have a function which enables selection of display mode of the three-dimensional image and the 2-dimensional image using the lens array 6 without occurring cross talk.

Although the example of using LCD 1 as the image display which has polarization as explained above, the image display wherein polarization is not used, for example, a Cathode Ray Tube (CRT), a Plasma Display Panel (PDP), Organic Light Emission Diode (OLED), Organic Electro Luminescence (EL), Field Emission Display (FED), or other displays known in the art, can be used by arranging a polarizing plate in front of a display surface, in effect providing polarization of the light corresponding to the displayed image.

As the lens array, an optical crystal which has birefringence, for example, calcite, quartz, etc. can be used as a lens by shaping. That is, it is not necessary a refractive index is variable in these elements which means these may be passive elements. Therefore, the liquid crystal lens array which may have birefringence as a passive element can be realized by solidification from a liquid crystal solvent, for example, using a polymerizable liquid crystal or mixing a monomer and a liquid crystal and polymerizing with ultraviolet rays or heat in the state of predetermined alignment.

In order to comprise a lens array with a liquid crystal lens and to create a lens effect only in a specific incident polarization direction, it is desirable that a structure encloses liquid crystal material between parallel substrates and the alignment-state of liquid crystal is controlled spatially by applied voltage. This may be realizable using a diffractive lens using a predetermined pitch giving a refractive index distribution in a incident plane, a refractive index distributed lens giving a refractive index distribution to a direction of optical propagation, or giving a refractive index distribution to both a direction of optical propagation and a plane of incidence.

In order to give a lenticular effect to a specific polarization direction, for example, it is may use a homogeneous alignment cell using a nematic liquid crystal which may have a positive dielectric anisotropy, and arranged perpendicularly a comb-like electrode to a alignment direction of liquid crystal in a predetermined pitch. It is possible to make a lenticular effect at the time of voltage applying in a specific polarization incident axis, and no lens effect to the other polarization incident axis.

Here, the lenticular effect points having a collective effect equivalent to a case where arranged in correspondence with a direction of a ridgeline of the lenticular (lens curvature is a direction of infinite) in the direction of a comb-like electrode. Further, with such a structure of a liquid crystal lens, a focus can be made variable by controlling applied voltage. By not applying voltage, a lens effect may be lost, and switching control of the lens effect may be attained by correspondingly switching the applied voltage.

Figure 4:
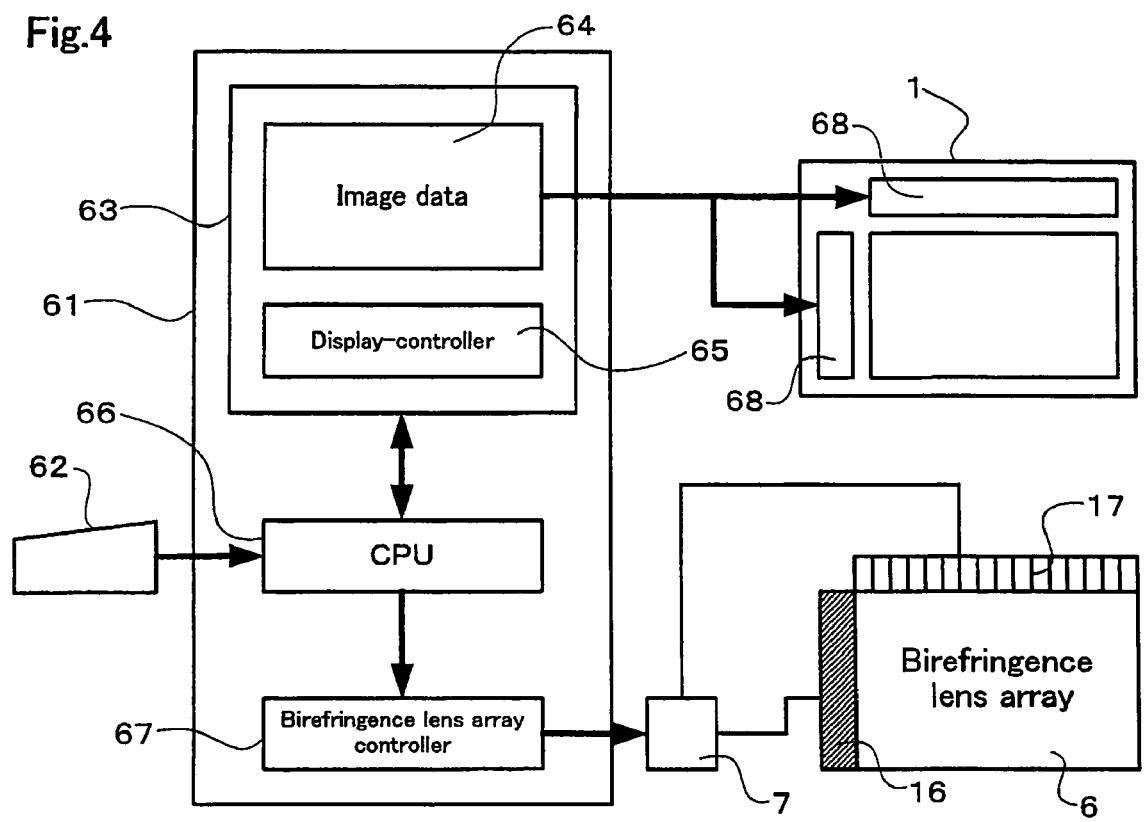
FIG. 4 shows a control block according to the first embodiment.

FIG. 4 is a view showing a control block diagram to control selection between of a two-dimensional image display and an autostereoscopic three-dimensional image display according to the first embodiment.

A change selection of the two-dimensional image display and the three-dimensional display by an observer may transmitted to an autostereoscopic three-dimensional image display-controller 61 through the two-dimensional image/autostereoscopic three-dimensional image display change selection input unit 62 which is switches, such as a keyboard and a mouse.

The autostereoscopic three-dimensional image display-controller 61 comprises a graphic controller 63 provided with a display controller 65 for controlling an image display of the LCD 1 and an image data 64 for displaying an image on the LCD 1, CPU 66, and a birefringent lens array controller 67 for controlling the applying voltage unit 7 of the birefringent lens array 6.

When an image display-mode selection signal from the observer is received, and the selected image display-mode is a three-dimensional image, the CPU 66 stores three-dimensional image data in the image data 64 and transmits the control signal of applied voltage ON to the birefringent lens array controller 67.

The birefringent lens array controller 67 may perform setup or controls for the parameters of an applied-voltage value, an applied-voltage wave, and frequency to the applying voltage unit 7. On the other hand, three-dimensional image data is displayed on LCD 1 by a graphic controller 63, and the three-dimensional image can be observed because an observer observes three-dimensional image data through the birefringent lens array 6 which voltage is applied by applying voltage unit 7, and has lens effect.

Similarly, when the two-dimensional image is selected, the CPU 66 displays two-dimensional image data on the LCD 1 via the graphic controller 63 course, and an observer can observe the equivalent two-dimensional image data as the usual LCD through the birefringent lens array 6 without the lens effect by transmitting the control signal of applied voltage OFF to the birefringent lens array controller 67.

In case of a passive element which a rotation angle of the polarization direction is fixed, a birefringent phase modulator can use a birefringent phase difference film using a transparent expanded film, and a birefringent optical crystals, such as calcite, quartz, etc.

The birefringent phase modulator is a so-called the half-wave film (or half-wave plate) with which retardation has one half to incident-wave length in order to rotate a plane of polarization. In case of using a single half-wave film, a phase axis may arrange a rotating angle of the plane of polarization at the angle equally divided to one half, but in order to mitigate wavelength dispersion and enlarge bandwidth, polarization rotating operations may be performed by using a half-wave film or a plurality of phase difference films near a half-wave. For example, a method of arranging two half-wave films in directions of 67.5 degrees and 22.5 degrees from an optical incident side, in case of the polarization rotating operation from 0 degree to 90 degrees is known, and it can be applied.

In order to make phase axis rotating of the birefringent phase modulator variable, it is suitable to use a liquid crystal cell for the birefringent phase modulator. In variable phase axis controls, a method of changing a phase axial angle, and a method of selecting an existence of a phase axis may be applicable.

In an example of techniques for changing a phase axial angle, liquid crystal cell modes of Surface Stabilized Ferroelectric Liquid Crystal (SSFLC) using a Ferroelectric Liquid Crystal (FLC) material which may have a spontaneous polarization, or Half-V Threshold-Less Anti-Ferroelectric (TLAF) using Anti-Ferroelectric Liquid Crystal (AFLC) material may be applicable. These two modes may be also desirable due to their speed of response.

Similarly, in the example of the method of selecting the existence of a phase axis, as the liquid crystal cell mode which can realize a fast response time such as a PI twist cell (bend alignment cell) using nematic liquid crystal material can be used.

Further, in case of using phase axis variable control of the birefringent phase modulator as a matrix type which can be partially selected, active matrix switching elements, such as a Thin-Film Transistor (TFT), may be unnecessary, and it may be desirable to use a liquid crystal cell mode which can be driven by a passive matrix type, i.e., a selection scan of a line-like as an electrode. As such the mode, Super Twisted Nematic (STN) and Bi-stable Twisted Nematic (BTN) mode using nematic-liquid-crystal material may be applicable.

Second Embodiment

Figure 5:
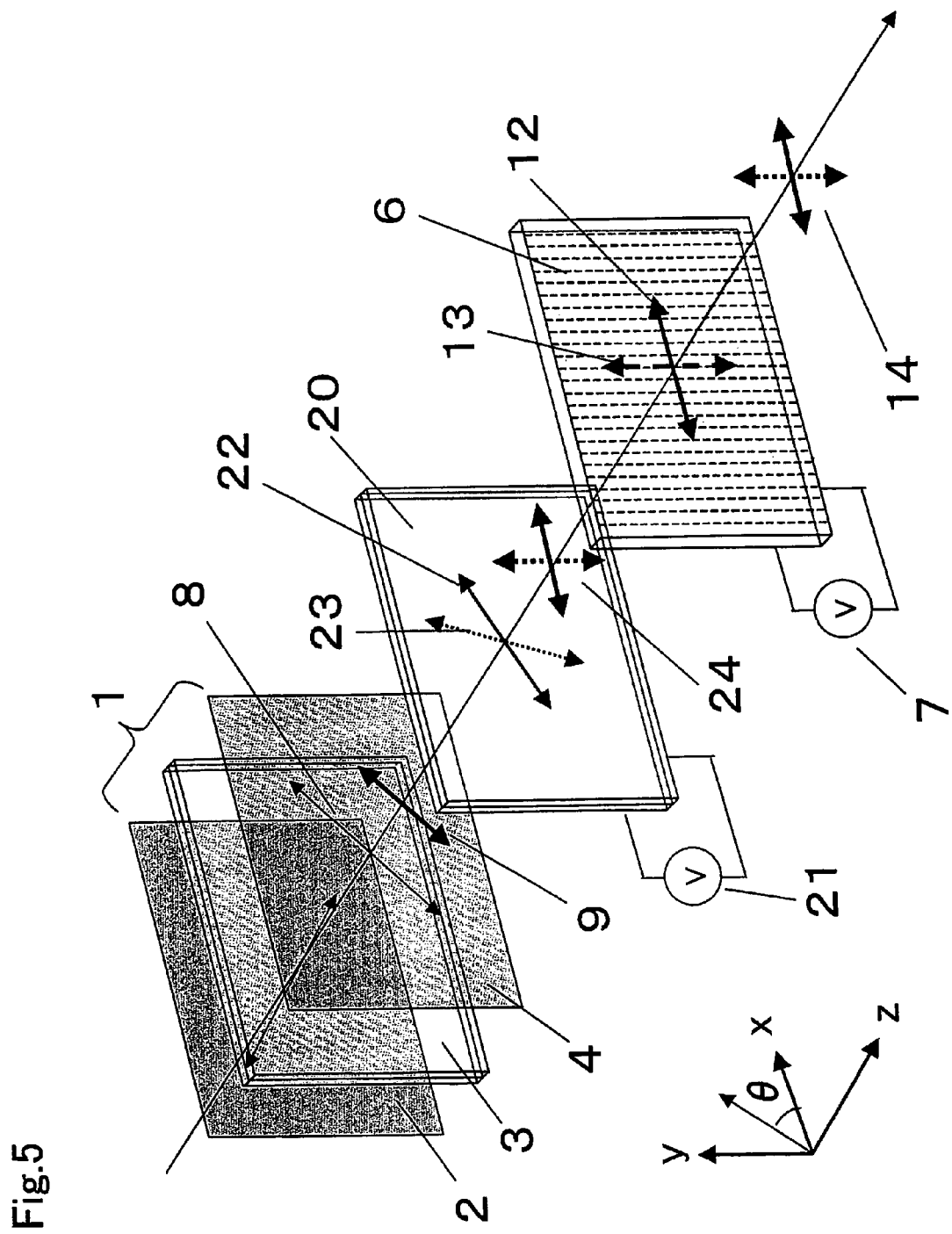
FIG. 5 shows a structure of an autostereoscopic three-dimensional image display apparatus according to the second embodiment of the present invention.

FIG. 5 shows a structure of an autostereoscopic three-dimensional image display apparatus according to the second embodiment in present invention.

Similarly to the previous embodiment, the autostereoscopic three-dimensional image display may have an LCD 1 as a image display, a birefringent lens array 6 which may have a lenticular effect in a lens pitch almost equal to an integral multiple of a pixel spacing of the LCD. A detailed explanation regarding similar elements is provided above for the previous embodiment and not duplicated below.

In this embodiment, a ferroelectric-liquid-crystal cell 20 which may have a spontaneous polarization may be used as a birefringent phase modulator. It becomes an active element, which changed a phase axis direction according to changing displays of a three-dimensional image and a two-dimensional image.

The ferroelectric-liquid-crystal cell 20 may enclose a ferroelectric liquid crystal among a pair of substrates. Further, on the substrate, electrodes may be arranged, respectively, and voltage can be applied to the ferroelectric liquid crystal. The ferroelectric-liquid-crystal cell 20 may have a spontaneous polarization, and when properly designed, a liquid crystal material and a cell gap works as a half-wave plate.

Figure 6:
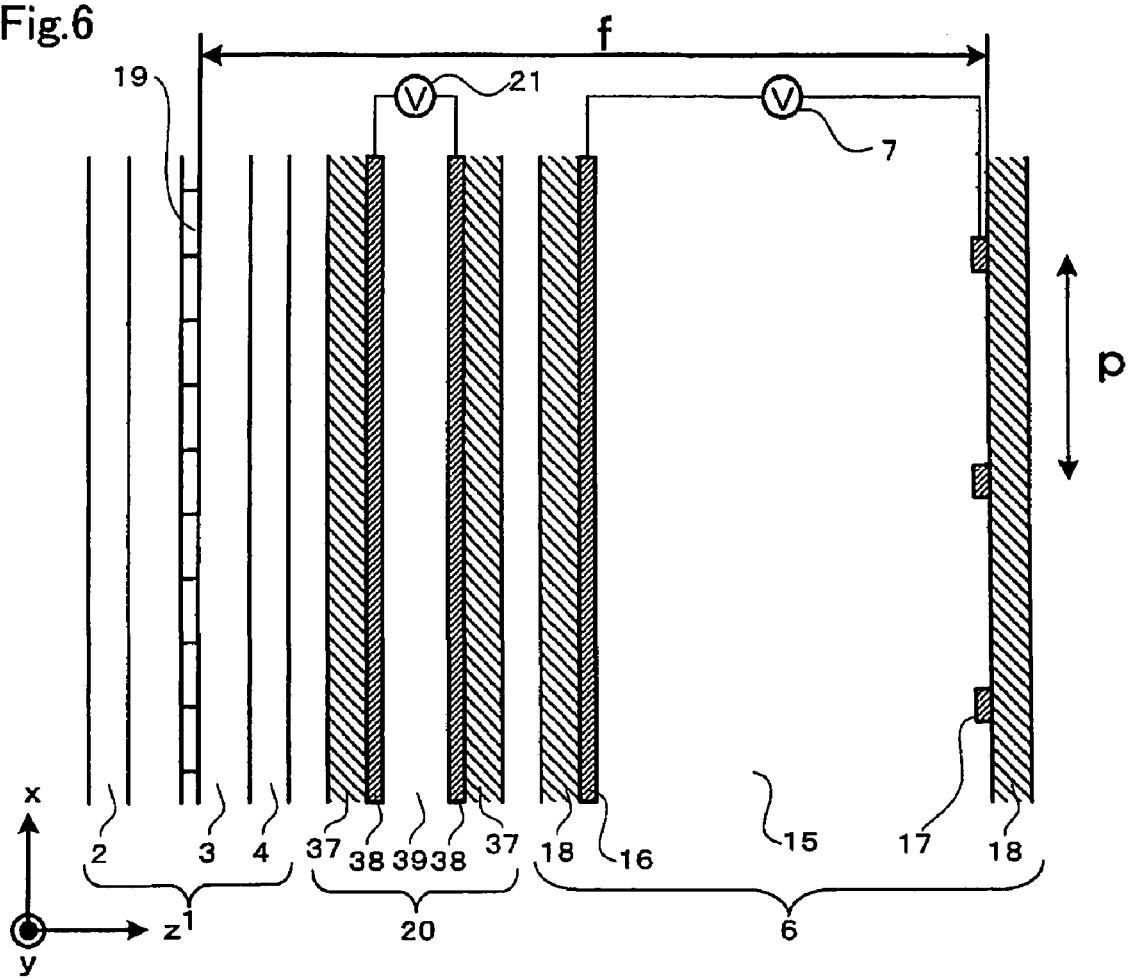
FIG. 6 is a sectional view showing a structure of the autostereoscopic three-dimensional image display apparatus according to the second embodiment.

FIG. 6 is a sectional view showing a structure of the autostereoscopic three-dimensional image display apparatus according to the second embodiment. In the ferroelectric-liquid-crystal cell 20, a ferroelectric liquid crystal 39 is arranged between common transparent electrodes 38 in transparent substrates 37, an alignment changes by applying voltage to a ferroelectric liquid crystal in an applying voltage unit 21 connected to the common transparent electrodes 38, and a phase axis direction may be changed. Through the ferroelectric-liquid-crystal cell 20, a focal length f may be set up on a pixel 19, similarly to the birefringent lens of the first embodiment. The substrate 3 which counters to the ferroelectric-liquid-crystal cell 20 can be common with the substrate 38 of the ferroelectric-liquid-crystal cell 20.

It is possible to control a phase axis in two states of a 1st phase axis direction of $\theta=22.5$ degrees (22 in FIG. 5), and a 2nd phase axis direction $\theta=67.5$ degrees (23 in FIG. 5) by performing a polarity change of applied voltage using the applying voltage unit 21.

Liquid crystal material may have spontaneous polarization, and since the cell gap may be thin, compared with a relatively slow response time of the liquid crystal lens, the ferroelectric-liquid-crystal cell 20 may quickly respond, for example, in less than 1 ms. Therefore, in case of changing a phase axis, it is possible to change by changing the voltage polarity using the applying voltage unit 21 in a very short period of time.

If the ferroelectric-liquid-crystal cell 20 is controlled in the 1st phase axis direction 22, when the light of LCD 1 has linear polarization 9 of $\theta=45$ degrees, a direction of an output linear polarization 24 from the ferroelectric-liquid-crystal cell 20 may become $\theta=0$ degrees. On the other hand, if it controls in the 2nd phase axis direction 23, a direction of an output linear polarization 24 from the ferroelectric-liquid-crystal cell 20 may become $\theta=90$ degrees.

Therefore, if the ferroelectric-liquid-crystal cell 20 is controlled by the 1st phase axis direction 22, the lens array 6 may function as a lens and will serve as an autostereoscopic three-dimensional image display mode. On the other hand, if controlled by the 2nd phase axis direction 23, the lens array 6 may not function as a lens, thus failing to display a three-dimensional image. In other words, it enters a two-dimensional image display mode.

Figure 7:
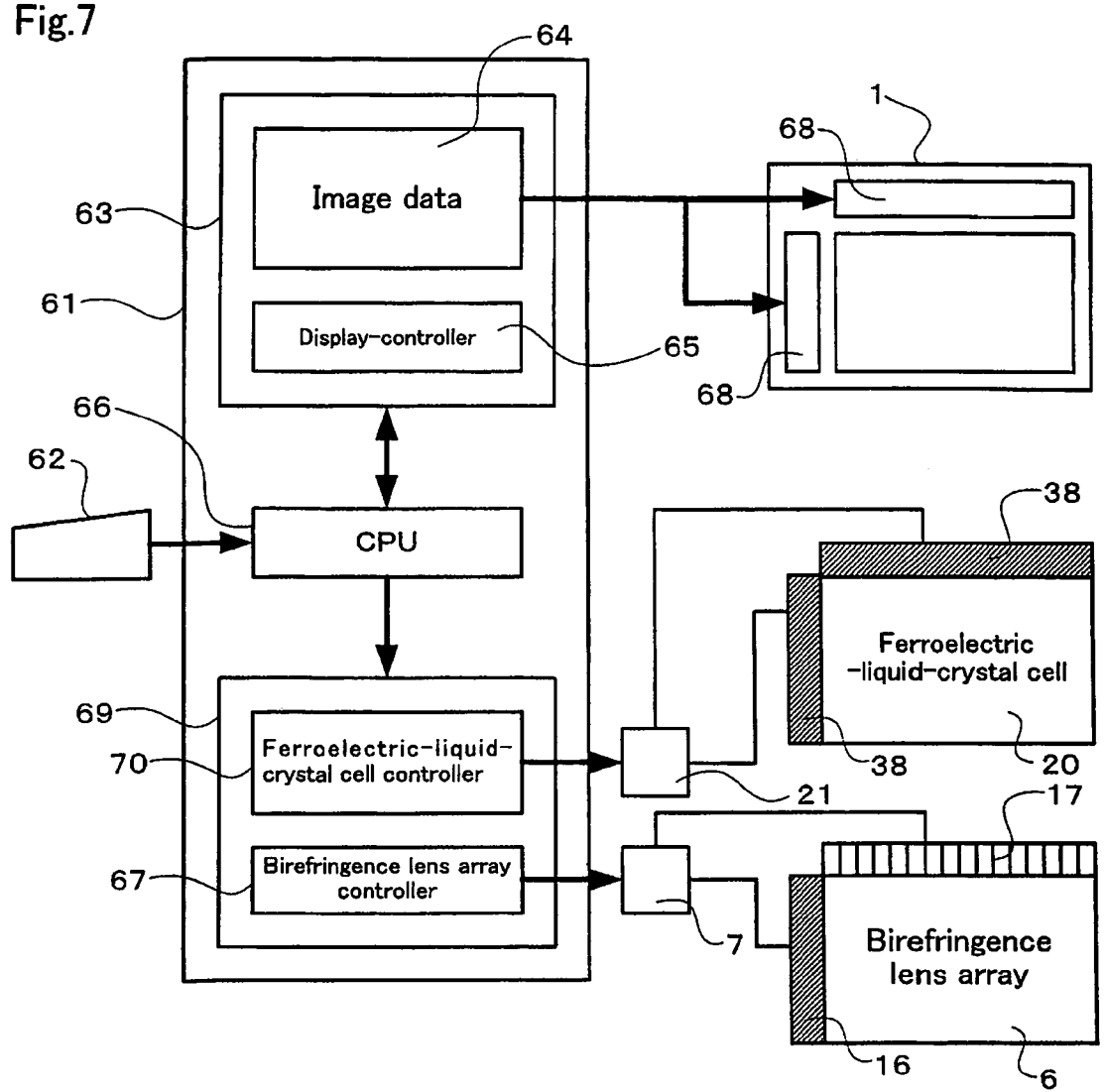
FIG. 7 shows a control block according to the second embodiment.

FIG. 7 shows a control block which may perform change control of the two-dimensional image/three-dimensional image according to the second embodiment. The two-dimensional image/three-dimensional image change control unit 69 which controls by applying voltage to the ferroelectric liquid crystal cell 20 and the birefringent lens array 6 comprises a ferroelectric liquid crystal cell controller 70 and a birefringent lens array controller 67, and it is possible to control applied voltage for the applying voltage unit 7 and 21 independently, respectively.

In present embodiment, when liquid crystal is used for the lens array 6, it is possible to maintain birefringent lens characteristics by applying voltage to the lens array 6 regularly, to select the polarity of the applying voltage unit 21 synchronizing with a selection display of the three-dimensional image and a two-dimensional image of the image display, and to make the lens array 6 act as a lens or not to make it act as a lens. Therefore, it is possible to change a display, without making an observer check by observing undesirable display characteristics which have been generated during a transient response time of a liquid crystal lens.

In addition, when the two-dimensional image is displayed continuously for a long period, it may be the lens array 6 in non-applying voltage as well as the first embodiment from a viewpoint of reducing power dissipation. Moreover, after a response of the liquid crystal lens is completed, even if the ferroelectric-liquid-crystal cell 20 does not have a memory characteristic, and is non-applied voltage, it is possible to observe the two-dimensional image.

FIG. 8 shows a relation of states of applying voltage units and output linearly polarizations in a two-dimensional image display mode 40 for displaying a two-dimensional image continuously for a long period, and the case of the two-dimensional image display 42 and the case of the autostereoscopic three-dimensional image display 43 in a two-dimensional image/three-dimensional image change display mode 41 which changes between a two-dimensional image and a three dimensional image by the phase axis direction of the ferroelectric liquid crystal cell 20.

In the two-dimensional image display mode 40, both the applying voltage unit 21 of the ferroelectric liquid crystal cell 20 and the applying voltage unit 7 of the birefringent lens array 6 may be in a state of non-applied voltage (OFF). Since the birefringent lens array 6 does not have a lens effect, an alignment-state of the ferroelectric-liquid-crystal cell 20 may be in the 1st phase axis direction or in the 2nd phase axis direction.

On the other hand, in the two-dimensional image/three-dimensional image change display mode 41, since voltage is applied by the applying voltage unit 7 of the birefringent lens array 6, the lens effect may occur to the linear polarization of a direction of θ=0 degrees, and the existence of the lens effect may be determined by being selected the incident direction of the linear polarization to the birefringent lens array 6 according to the applied-voltage polarity to the ferroelectric-liquid-crystal cell 20.

The change between the two-dimensional image and the three-dimensional image in the two-dimensional image/three-dimensional image change display mode 41 can not be observed on an undesirable image during the transient response because the response of the ferroelectric-liquid-crystal cell 20 may be very fast. However, it may be desirable to change the mode by the predetermined sequence, since a change to the two-dimensional image/three-dimensional image change display mode 41 from the two-dimensional image display mode 40 or a change of an opposite direction accompanies an alignment change of the birefringent lens array which may have a slow response.

Figure 9:
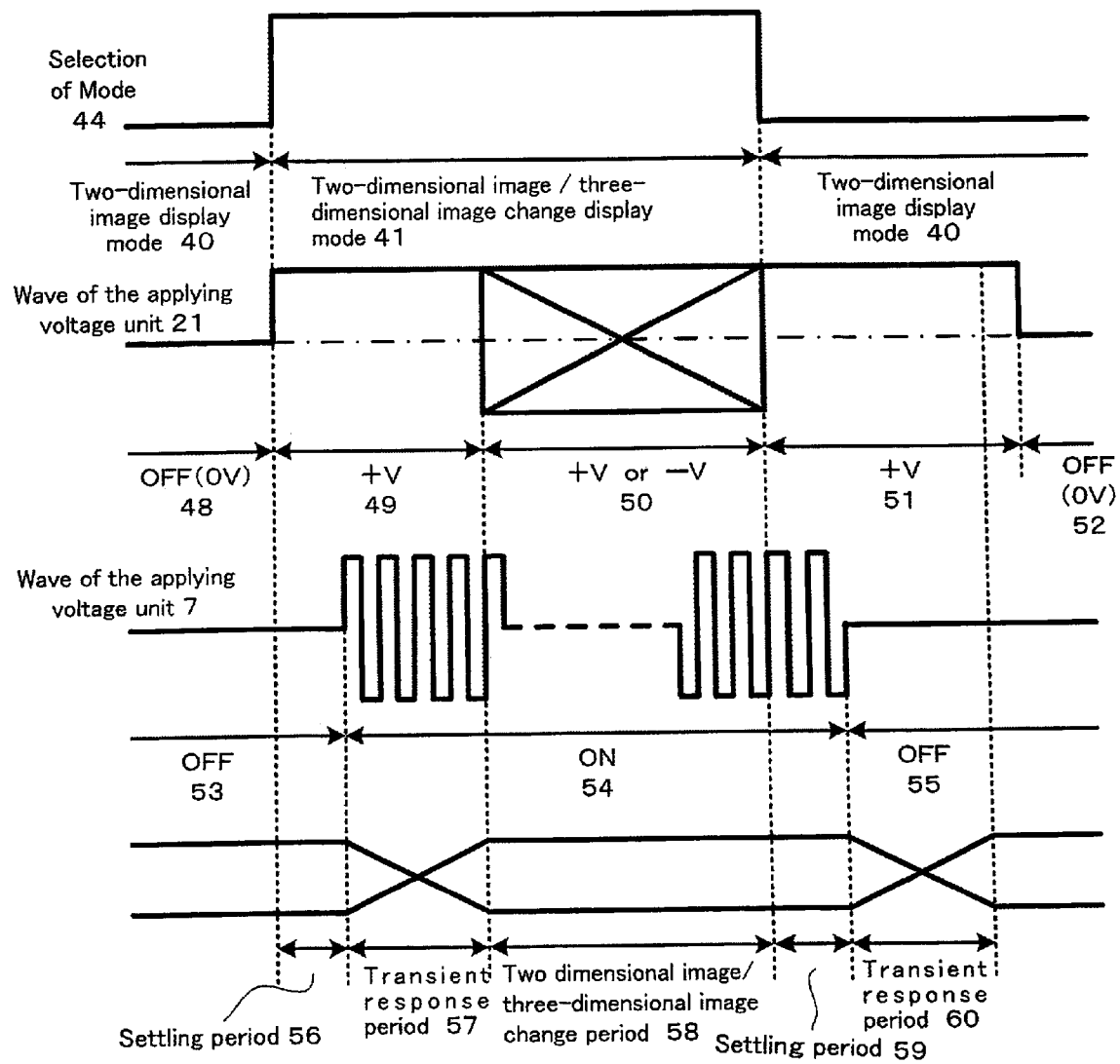
FIG. 9 shows a sequence at changing an image display mode consistent with the second embodiment of the present invention.

FIG. 9 shows a sequence corresponding to changing image display modes as described above. If a mode selection is performed to the two-dimensional image/three-dimensional image change display mode 41 from the two-dimensional image display mode 40 by the observer, a positive voltage polarity +V is applied to the ferroelectric-liquid-crystal cell 20 at the time of the two-dimensional image display from the state of non-applied voltage (OFF) by the applying voltage unit 21. After a settling period 56 which is when the response of the ferroelectric liquid crystal cell 20 ends completely, a voltage is applied to the birefringent lens array 6 by the applying voltage unit 7. Although the lens effect may occur gradually to the linear polarization of the direction of θ=0 degrees in the birefringent lens array 6 during a transient response period 57, since the two-dimensional image display may be selected in the ferroelectric-liquid-crystal cell 20, an observed image display may not change. After the response of the birefringent lens array 6 may be completed, it is possible to select the two-dimensional image/three-dimensional image change, and a display mode may be selected by an applied-voltage polarity to the ferroelectric liquid crystal cell 20.

On the other hand, when the mode change from a two-dimensional image/three-dimensional image mode 41 to the two-dimensional image display mode 40 is selected, in reverse order above-mentioned procedure, a two-dimensional image may be displayed in the two-dimensional image/three-dimensional image change display mode 41 of the ferroelectric-liquid-crystal cell 20, and an applied voltage to the birefringent lens array 6 may be subsequently made to shift to the state of non-applying voltage. After a transient response period 60 wherein the lens effect of the birefringent lens array 6 may disappears completely, may ceases to apply voltage to the ferroelectric liquid crystal cell 20, thus entering the state of non-applying voltage. It is possible to continue observing two-dimensional image by this sequence for an observer, without observing the non-desired display. Further, it is also possible to use the lens array 6 which does not depend on liquid crystal mentioned in a previous embodiment.

Third Embodiment

Figure 10:
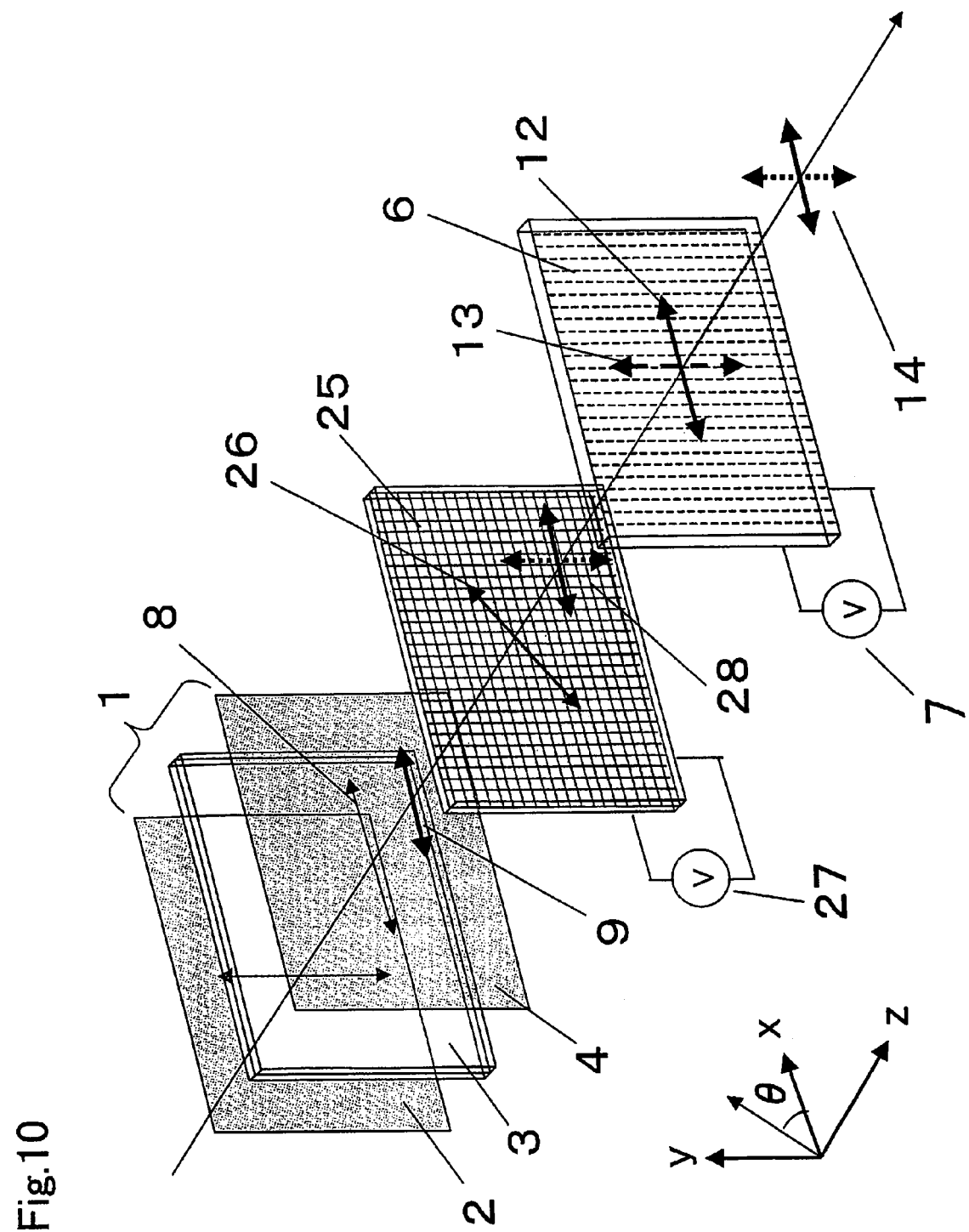
FIG. 10 shows a structure of an autostereoscopic three-dimensional image display apparatus according to the third embodiment of the present invention.
Figure 13:
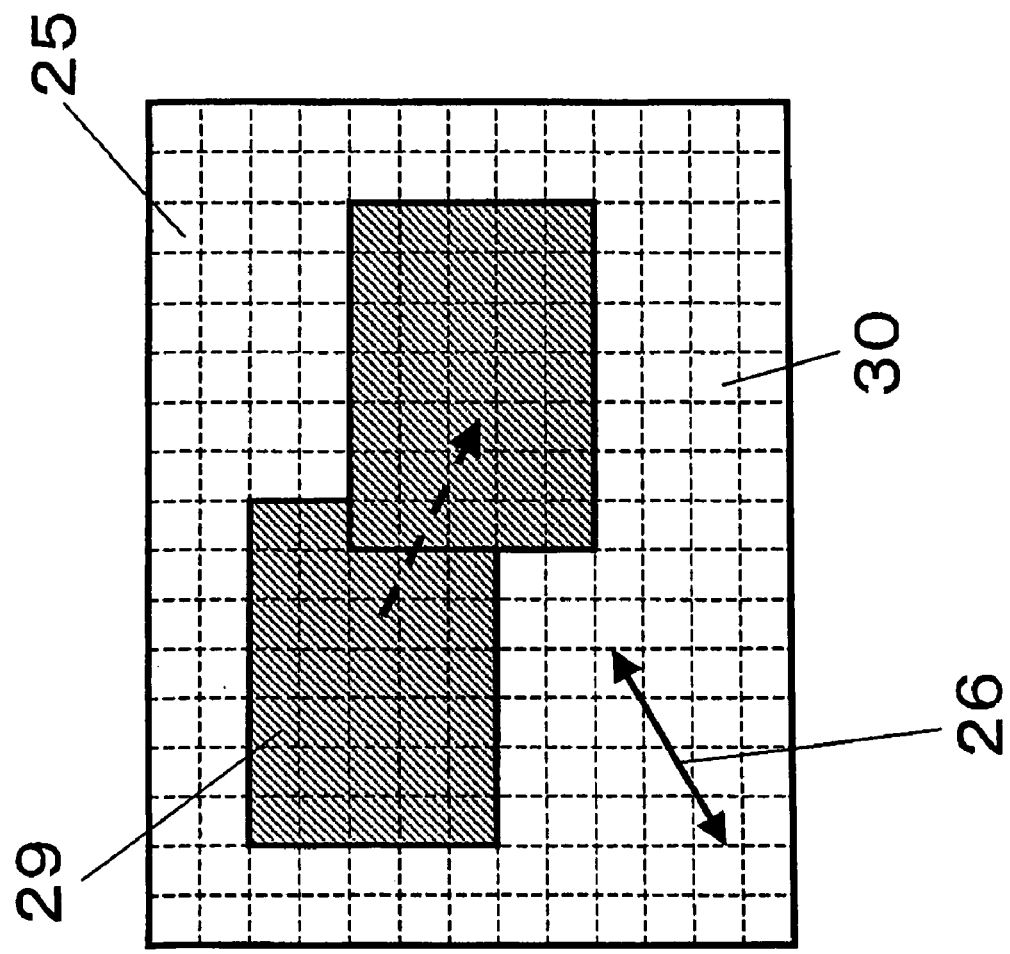
FIG. 13 is a front view showing a relation of the drive state of the autostereoscopic three-dimensional image display area and a liquid crystal cell.

FIG. 10 shows a structure of an autostereoscopic three-dimensional image display apparatus according to the third embodiment in present invention. Moreover, FIG. 13 is a front view showing a relation of the driving state of the autostereoscopic three-dimensional image display area and a liquid crystal cell.

Similar to the previous embodiment, the autostereoscopic three-dimensional image display may use LCD 1 as an image display, a birefringent lens array 6 which has a lenticular effect in a lens pitch almost equal to as much as some integral number of times of a pixel pitch of the LCD. A detailed explanation regarding similar elements is provided above for the previous embodiments and is not duplicated below.

In this embodiment, the birefringent phase modulator may be a liquid crystal cell 25 in which a matrix drive is possible. The polarization direction 4 of the image light in the LCD 1 is explained as θ=0 degrees for simplicity. Such a polarization plate arrangement can be applied characteristics in Vertically Align (VA), In-Plane-Switching (IPS) mode, etc, without an adverse influence on the visual-angle.

The liquid crystal cell 25 may enclose liquid crystal among a pair of substrates, and an electrode, which applies voltage to liquid crystal, is arranged on the both substrates. This liquid crystal cell 25 comprises the electrode of which a matrix drive is possible. Here, the matrix drive may divide a display area of the liquid crystal cell 25 into a plurality of areas 30, and applying voltage to the desired domain 30, as shown in FIG. 13. As the electrode structure of the matrix drive, a TFT drive for an ordinary liquid crystal display, or a passive matrix drive which may apply a predetermined voltage pulse, and may have a structure of crossed comb-like electrodes, may be applicable.

Figure 11:
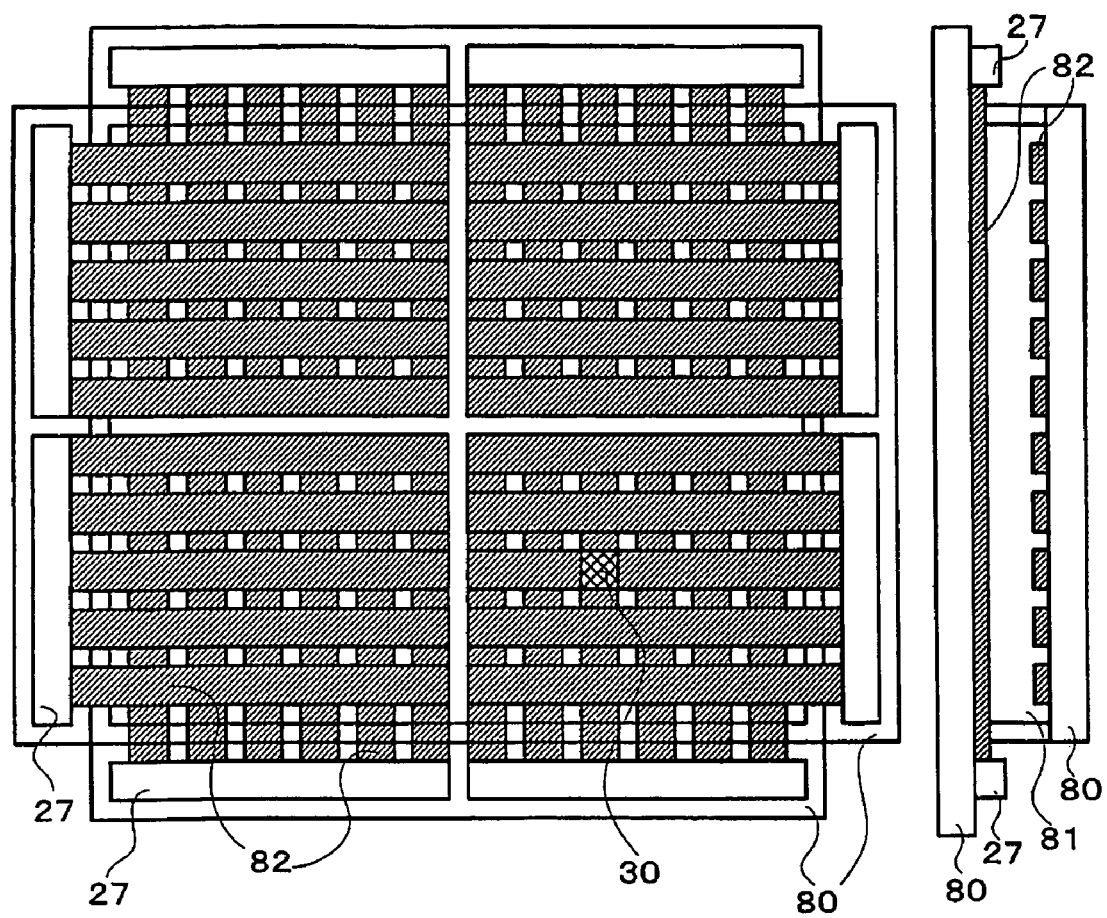
FIG. 11 shows a structure of a liquid crystal cell using passive matrix.

As an example of the liquid crystal cell 25 of which a matrix drive is possible, FIG. 11 is a view showing a structure of a liquid crystal cell using a STN mode liquid crystal cell of the passive matrix.

In the liquid crystal cell 25, a liquid crystal 81 in STN mode may be arranged between transparent substrates 80 which arranged a comb-like transparent electrode 82, respectively. The LCD driver is arranged as an applying voltage unit 27 so that desired voltage can be applied to some domain 30 by applying the voltage pulse to comb-like transparent electrodes 82.

Figure 12:
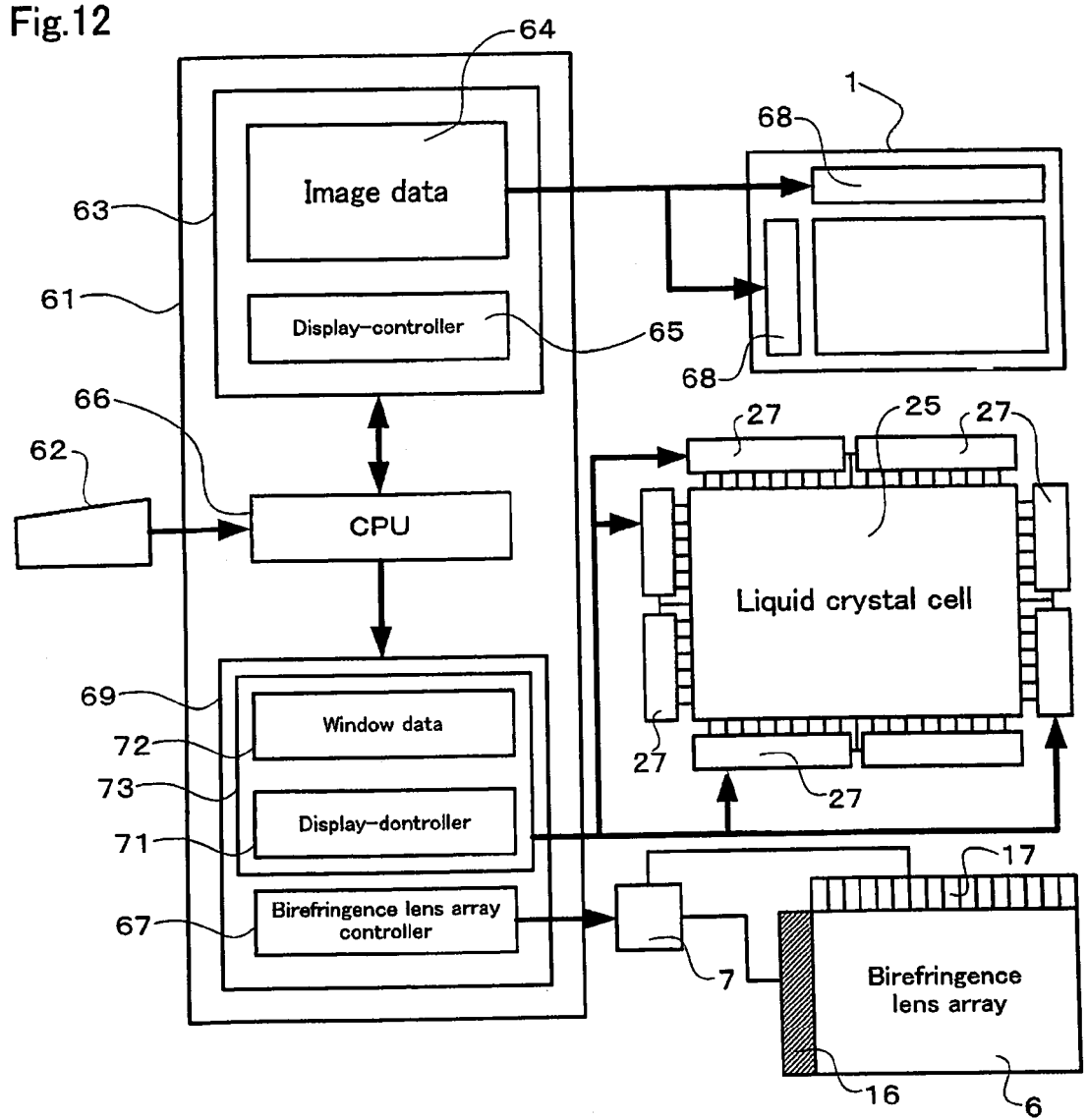
FIG. 12 shows a control block according to the third embodiment.

FIG. 12 shows a control block according to the third embodiment. A two-dimensional image/three-dimensional image change controller 69 has a graphic controller 71 for displaying and controlling a window in a desired position of the liquid crystal cell 25, and controls displaying the window of the same display position and size in the liquid crystal cell 25 corresponding to a three-dimensional image data partially saved in a image data 64 of a graphic controller 63 by the side of the LCD 1.

In this embodiment, a phase axis may disappear, the polarization direction of incident light is transmitted without changing in the domain 29 which applied voltage to liquid crystal. Moreover, the polarization direction of incident light is rotated in the domain, which is not applied voltage. Of course, it is also possible to rotate the polarization direction of incidence light in the domain, which applied voltage, and not to rotate the polarization direction in other domains, based on a kind of using liquid crystal mode.

Referring to FIG. 13, in the domain 29 of the liquid crystal cell 25, since a light is transmitted without changing a polarized component, image light is transmitted by the liquid crystal cell 25 with linear polarization 9 ($\theta=0$ degrees). The direction of the linear polarization 28 which comes out from the liquid crystal cell 25 may be $\theta=0$-degrees, and may enter into the lens array 6. Therefore, in the lens array 6, a lens effect may occurs in the domain 29.

On the other hand, since phase axis 26 is $\theta=45$ degrees in a domain of non-applied voltage, an output polarization direction of the liquid crystal cell 25 is rotated at $\theta=90$ degrees, and a lens effect does not occur in the lens array 6.

As explained above, the liquid crystal cell 25 which fulfills half-wave conditions and in which a matrix drive is possible may be arranged between the image display 1 and the lens array 6, and it is possible to display easily the three-dimensional image and the two-dimensional image on one screen by applying voltage to the domain 29 in part of the liquid crystal cell 25 by the applying voltage unit 27. For example, in FIG. 13, the domain 29 applied voltage is a window area in the two-dimensional image displaying area, and it is possible to display the three-dimensional image in the window. Even if a moving operation of the window is commanded by a mouse, it is possible to display the three-dimensional image on at any positions by moving the domain 29 applied voltages synchronizing with the operation.

Figure 14:
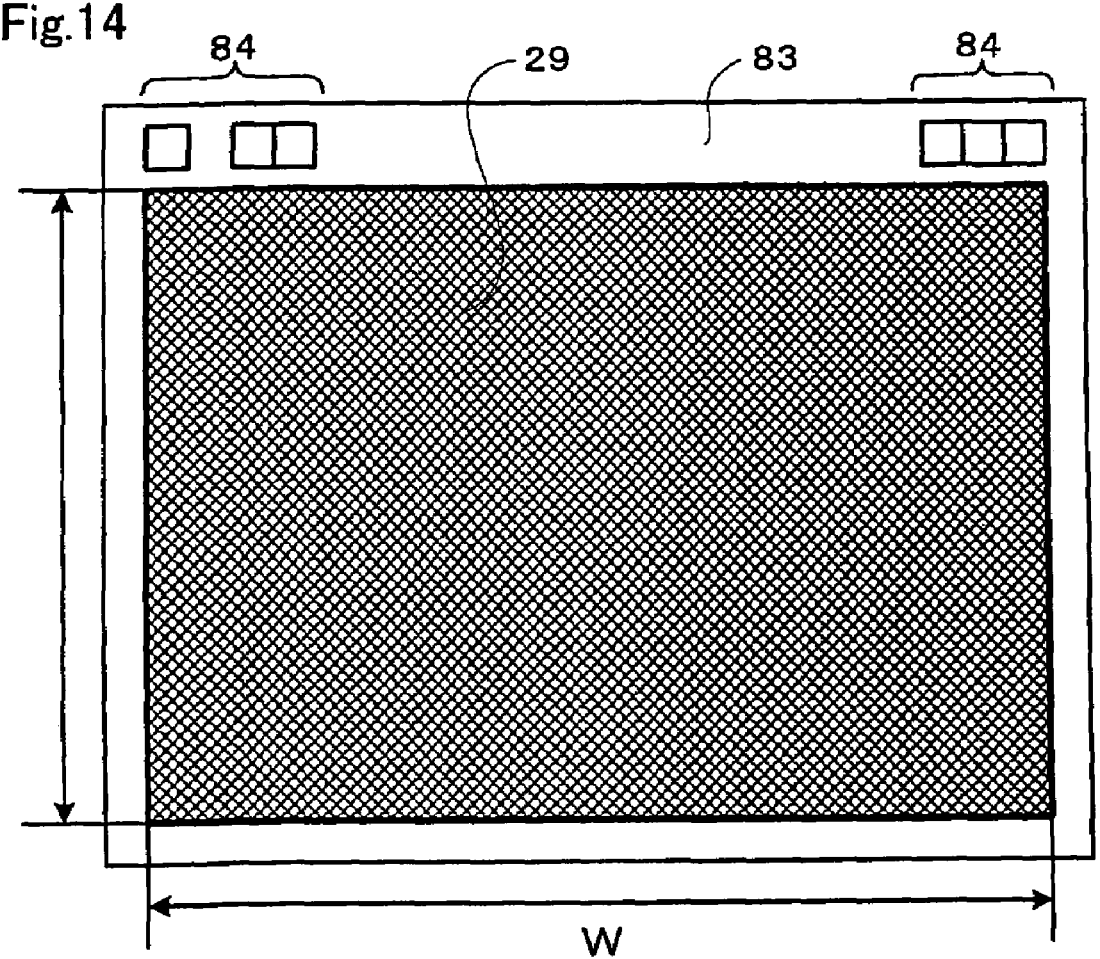
FIG. 14 shows a case of window screen according to the third embodiment.

FIG. 14 shows a case of window screen according to the third embodiment. When the autostereoscopic three-dimensional image display is selected, a three-dimensional image may be displayed on the domain 29. An area 83 which is outside of the domain 29 is displayed in high definition by two-dimensional image display, and a window control bar for operating a window and a control button 84 which may select the two-dimensional image display and the autostereoscopic three-dimensional image display in the domain 29 may be arranged in the window control bar domain with the control buttons which have generally in order to operate to open or close of the window. Here, it may be desirable that a horizontal display size W of the domain 29 is as much as some integral number times of a pitch p of the birefringent lens array 6 and a vertical display-size H is as much as some integral number of times of a vertical size of the unit domain 30 in the liquid crystal cell 25, and, clipping is carried out so that the displayed position of the window may be satisfied with this condition in case of moving, or an expanding operation, etc.

Figure 15:
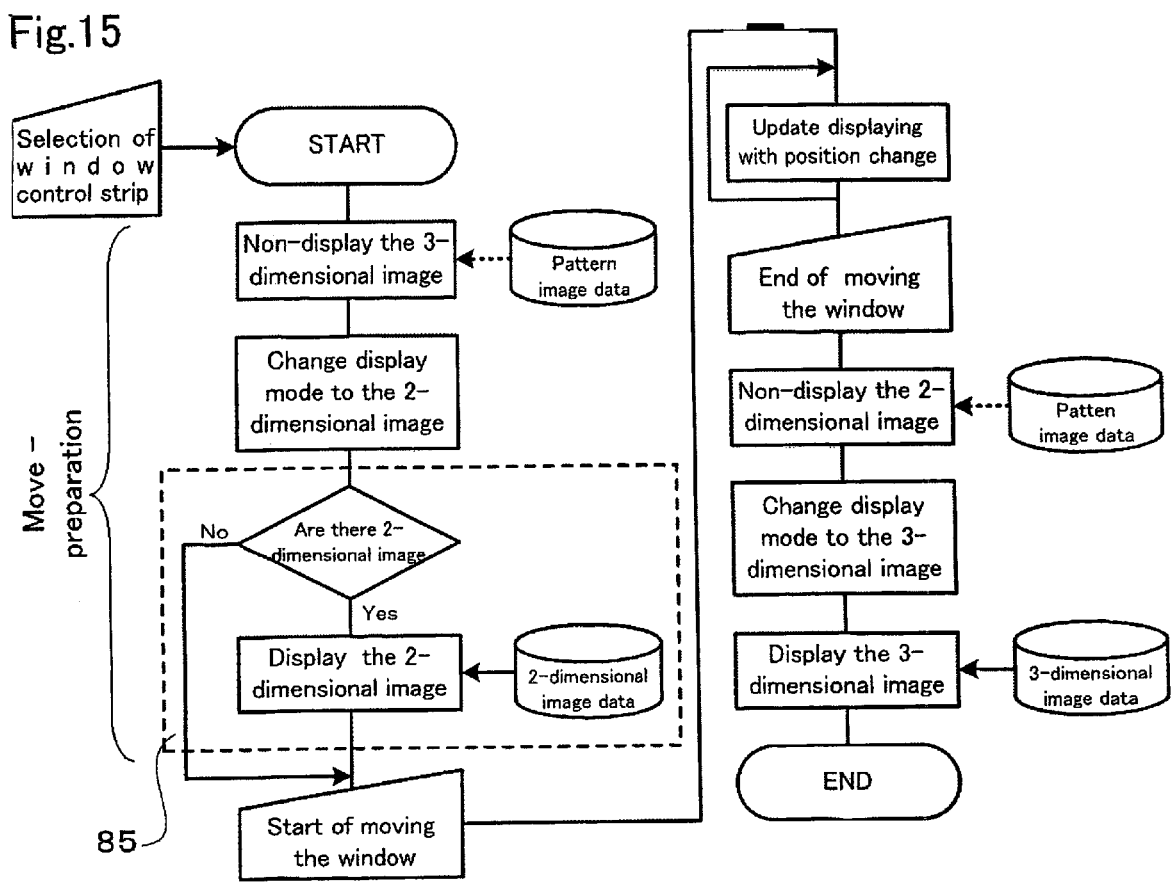
FIG. 15 shows a flow chart of moving a window display position.

FIG. 15 shows an example of the desirable display sequence of a display-position change of a window is operated at the autostereoscopic three-dimensional image display. When the control bar of the window is selected by the observer (by, for example, "clicking" on a selected portion of the control strip using a mouse), the three-dimensional image is not displayed by displaying the pre-determined pattern image, etc, as a process of preparation of moving operation, and the display mode is changed to the two-dimensional image display after that. Furthermore, it may display a two-dimensional image by checking whether the two-dimensional image data corresponding to the three-dimensional image which was displayed exists or not before the display mode change, and perform the process 85 which displays a 2-dimensional picture. Using this process, it may not be necessary to update in detail the autostereoscopic three-dimensional image display with changing the display position during the moving operation of the window. Even if the response time of the liquid-crystal-display mode is not fast such as STN mode, an undesirable image resulting from the mismatch (response delay) of the displayed position of the image data and the window of the liquid crystal cell can not be observed. After the moving operation by an observer is completed, the three-dimensional image is displayed after changing to the three-dimensional display mode.

Fourth Embodiment

Figure 16:
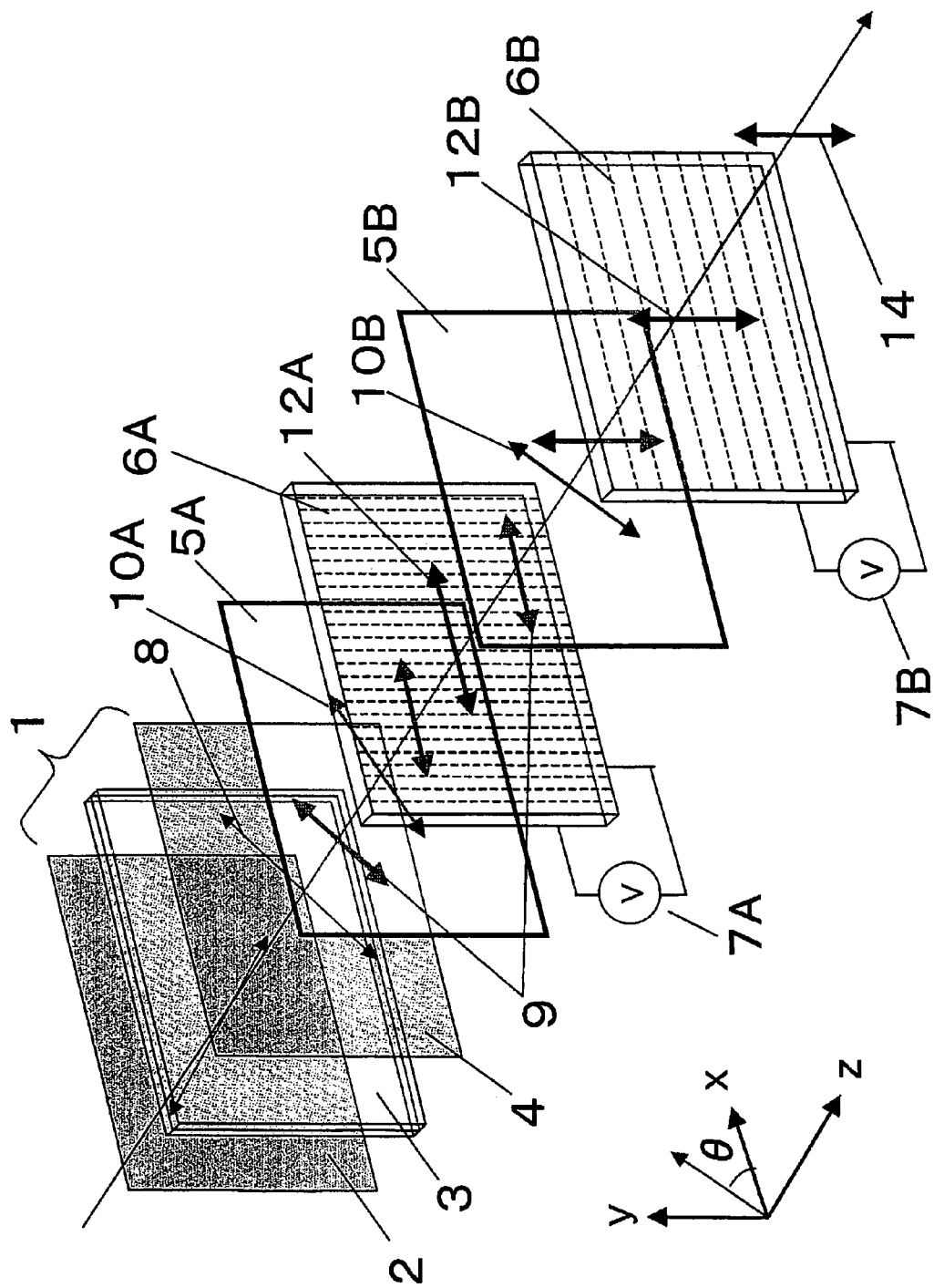
FIG. 16 shows a block diagram of an autostereoscopic three-dimensional image display apparatus according to the forth embodiment of the present invention.

FIG. 16 shows a block diagram of an autostereoscopic three-dimensional image display apparatus according to the fourth embodiment in present invention. In this embodiment, a half-wave film 5B and liquid crystal lens 6B is added to the first embodiment, and given a vertical direction parallax by making a birefringent phase modulator and a lens array to two-step stricture.

Similarly to the previous embodiment, the autostereoscopic three-dimensional image display may have LCD 1 as a image display, a birefringent lens array 6 which has a lenticular effect in a lens pitch almost as much as some integral number of times of a pixel of the LCD. A detailed explanation regarding similar elements is provided above for the previous embodiments and is not duplicated here. Moreover, a birefringent phase modulator 5A may be arranged between the LCD 1 and the lens array 6A.

Newly added lens array 6B may have the same structure as the lens array 6A rotated 90 degrees, and has a lenticular effect of the screen vertical direction to polarization direction 12B of $\theta=90$-degree at the applied voltage. Similarly to the lens array 6A, a focal length of the lens is arranged so that it may be located in the pixel part of LCD 1.

A phase axis direction 10B of added birefringent phase modulator 5B is $\theta=45$-degree direction, rotates the $\theta=0$ degree of the output polarization directions of the lens array 6A to 90 degrees, and carries out incidence to lens array 6B. Thereby, in the light, which carries out incidence to lens array 6B, the lens effect occurs in the lens array 6B.

Figure 17:
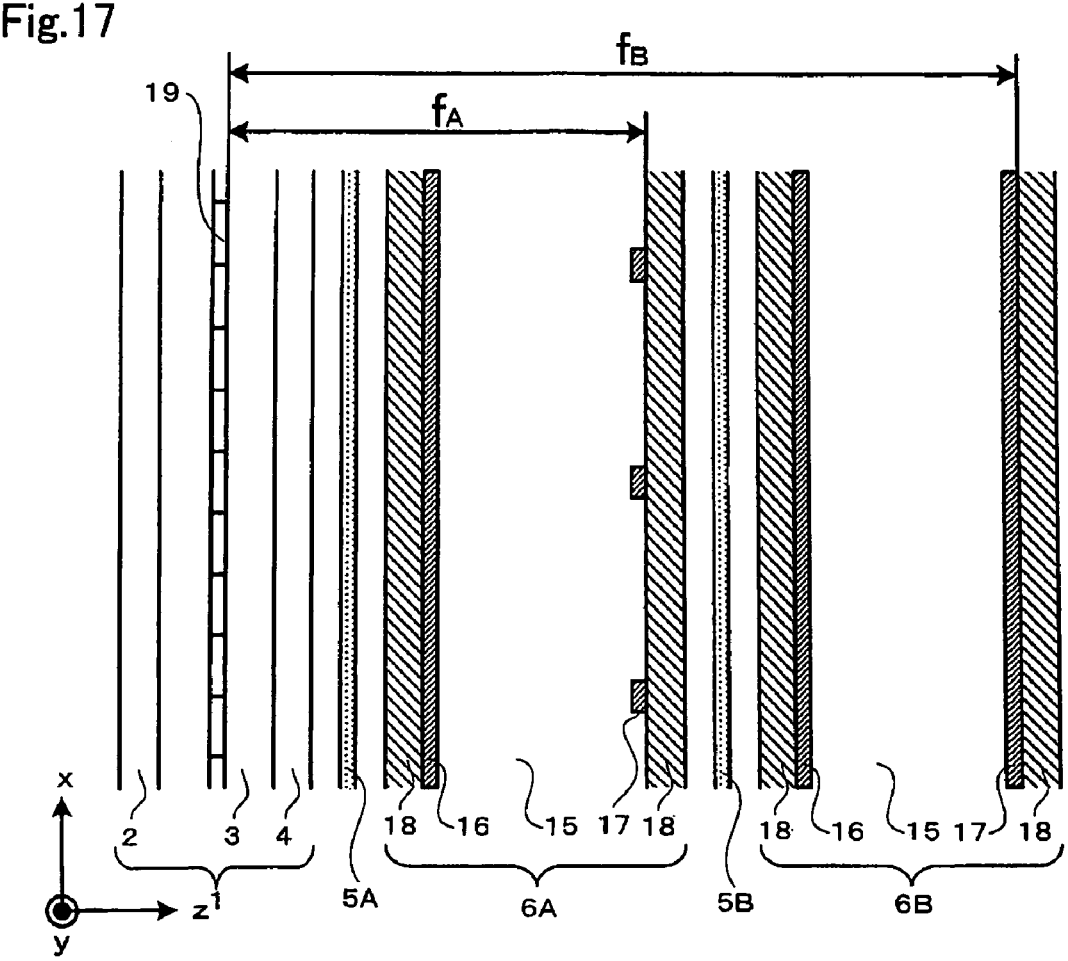
FIG. 17 is a sectional view showing a structure of an autostereoscopic three-dimensional image display apparatus according to the forth embodiment.

FIG. 17 shows a sectional view of an autostereoscopic three-dimensional image display apparatus according to the forth embodiment. Similar to the previous embodiment, the focal lengths fA and fB of the birefringent lens array 6A, which generates a vertical direction parallax, and the birefringent lens array 6B, which generate a horizontal direction parallax, are arranged so that a focus may be located in the pixel 19 of the LCD 1. Since the lens effect in both birefringent lens arrays generates crosswise in a horizontal direction and a vertical direction of a screen, a focal length may be set up independently with regardless of a mutual lens state.

Using such a two-step structure, it may be possible to not only display the three-dimensional image and the two-dimensional image selectively, but also add freely the horizontal direction parallax and the vertical direction parallax in the autostereoscopic three-dimensional image display by controlling applied voltage at each liquid crystal lens 6A and 6B independently. Moreover, it may be possible to set up a plurality of parallaxes in the three-dimensional display by dividing the comb-like electrode in each liquid crystal lens into some groups and controlling the groups independently. Since a plurality of conditions can be set up for numbers of the horizontal direction parallax by a number of vertical direction parallax, such as 16 by 6 and 32 by 3, it is possible to set up the optimal autostereoscopic three-dimensional image display condition adjusting for display contents and observation conditions.

Figure 18:
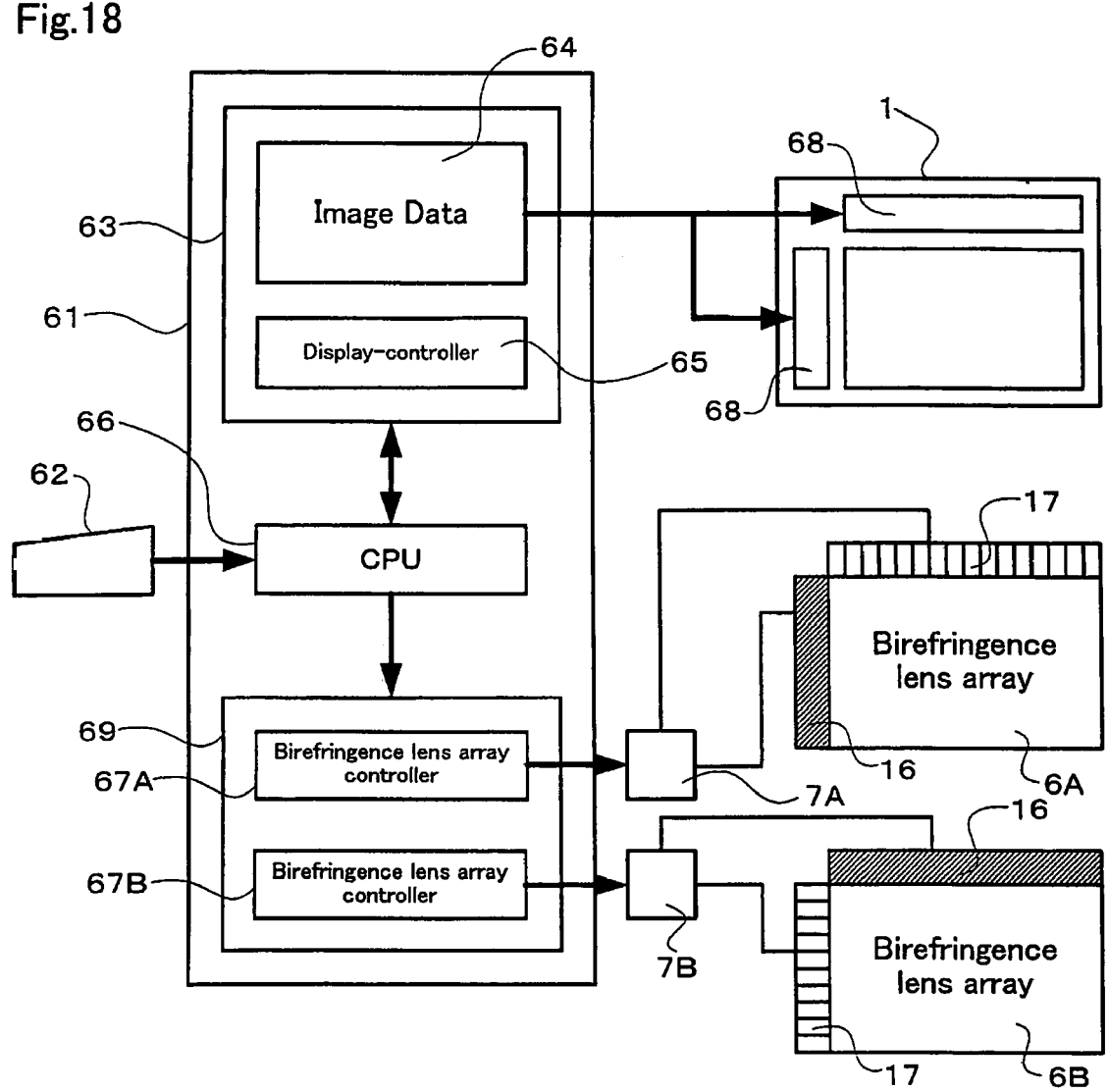
FIG. 18 shows a control block according to the forth embodiment.

FIG. 18 shows a control block diagram consistent with to the forth embodiment of the invention. The two-dimensional image/three-dimensional image change controller 69 which controls the birefringent lens arrays 6A and 6B comprises birefringent lens array controllers 67A and 68B which may control each lens array independently. In an image data area 64 of a graphic controller 63, a two-dimensional image, or a three-dimensional image data, which has predetermined parallaxes according to a display mode, is saved, and is displayed on the LCD 1.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A three-dimensional image display apparatus, comprising:
   an image display having a plurality of pixels configured in an array, wherein the image display is configured to output an image light having polarization;
   a lens array in front of the image display, configured to function as a lens for light having a first polarization direction, and not function as a lens for light having a polarization direction differing from the first polarization direction; and
   a birefringent phase modulator between the image display and the lens array, wherein the birefringent phase modulator is configured to rotate a polarization plane of the image light in same direction as the first polarization direction.

2. The three-dimensional image display apparatus according to claim 1, wherein the birefringent phase modulator has a variable phase axis direction which is controlled by an applied voltage.

3. The three-dimensional image display apparatus according to claim 1, wherein the birefringent phase modulator has a phase axis direction being variable on a portion of a screen of the image display.

4. The three-dimensional image display apparatus according to claim 1, wherein the birefringent phase modulator has phase axis directions that differ on a screen of the image display.

5. The three-dimensional image display apparatus according to claim 1, wherein the lens array has a liquid crystal layer and a pair of electrodes which sandwich the liquid crystal layer, and controls a focal distance by applying a voltage between the pair of electrodes.

6. The three-dimensional image display apparatus according to claim 1, wherein the birefringent phase modulator has a liquid crystal layer and a pair of electrodes which sandwich the liquid crystal layer, and is configured to control a phase-axis by a polarity of a voltage applied to the electrodes.

7. The three-dimensional image display apparatus according to claim 6, wherein the birefringent phase modulator is configured to change a three-dimensional image display and a two-dimensional image display by controlling the phase-axis according to a selection of a three-dimensional image and a two-dimensional image.

8. The three-dimensional image display apparatus according to claim 1, wherein the birefringent phase modulator has a liquid crystal layer and a pair of electrodes which sandwich the liquid crystal layer, and is configured to control a phase-axis by a voltage applied to the electrodes.

9. The three-dimensional image display apparatus according to claim 8, wherein the birefringent phase modulator is configured to change a three-dimensional image display and a two-dimensional image display by controlling the applied voltage according to a selection of a three-dimensional image and a two-dimensional image.

10. The three-dimensional image display apparatus according to claim 1, wherein the birefringent phase modulator has a liquid crystal layer which is driven by a matrix and a pair of electrodes which sandwich the liquid crystal layer, and is configured to control a phase-axis partially by a voltage applied to the electrodes.

11. The three-dimensional image display apparatus according to claim 10, wherein the birefringent phase modulator is configured to change a three-dimensional image display and a two-dimensional image display partially by controlling the applied voltage according to a selection of a three-dimensional image and a two-dimensional image.

12. A three-dimensional image display apparatus, comprising:
    an image display having a plurality of pixels configured in an array, wherein the image display is configured to output an image light having polarization;
    a lens array in front of the image display, having a liquid crystal layer and a pair of electrodes which sandwich the liquid crystal layer, and configured to control a lens action for light having a first polarization direction by applying a voltage; and
    a birefringent phase modulator between the image display and the lens array and configured to rotate a polarization plane of the image light in same direction as the first polarization direction.

13. The three-dimensional image display apparatus according to claim 12, wherein one of the electrodes has a comb-like structure.

14. The three-dimensional image display apparatus according to claim 12, wherein the lens array is configured to change a three-dimensional image display and a two-dimensional image display by controlling the applied voltage according to a selection of a three-dimensional image and a two-dimensional image.

15. The three-dimensional image display apparatus according to claim 12, wherein the birefringent phase modulator has a liquid crystal layer and a pair of electrodes which sandwich the liquid crystal layer, and is configured to control a phase-axis by a polarity of a voltage applied to the electrodes.

16. The three-dimensional image display apparatus of claim 15, wherein the birefringent phase modulator is configured to change a three-dimensional image display and a two-dimensional image display by controlling the phase-axis according to a selection of a three-dimensional image and a two-dimensional image.

17. The three-dimensional image display apparatus according to claim 16, wherein the lens array is configured to control the applied voltage of the lens array, when the two-dimensional image is selected by controlling the polarity of applied voltage of the birefringent phase modulator.

18. The three-dimensional image display apparatus according to claim 12, wherein the birefringent phase modulator has a liquid crystal layer and a pair of electrodes which sandwich the liquid crystal layer, and is configured to control a phase-axis by a voltage applied to the electrodes.

19. The three-dimensional image display apparatus according to claim 18, wherein the birefringent phase modulator is configured to change a three-dimensional image display and a two-dimensional image display by controlling the applied voltage according to a selection of a three-dimensional image and a two-dimensional image.

20. The three-dimensional image display apparatus according to claim 12, wherein the birefringent phase modulator has a liquid crystal layer which is driven by a matrix and a pair of electrodes which sandwich the liquid crystal layer, and is configured to control a phase-axis partially by a voltage applied to the electrodes.

21. The three-dimensional image display apparatus according to claim 20, wherein the birefringent phase modulator is configured to change a three-dimensional image display and a two-dimensional image display partially by controlling the applied voltage according to a selection of a three-dimensional image and a two-dimensional image.

22. A three-dimensional image display apparatus, comprising:
- an image display configured to array a plurality of pixels and output an image light which has polarization;
- a first lens array in front of the image display, including a liquid crystal layer and a pair of electrodes which sandwich the liquid crystal layer, and configured to control by an applied voltage a lens effect to light which has a first polarization direction;
- a second lens array in front of the first lens array, including a liquid crystal layer and a pair of electrodes which sandwich the liquid crystal layer, and configured to control by an applied voltage a lens effect to light which has a second polarization direction that differs from the first polarization direction;
- a first birefringent phase modulator between the image display and the first lens array and configured to rotate a polarization plane of the image light in same direction as the first polarization direction; and
- a second birefringent phase modulator between the first lens array and the second lens array and configured to rotate a polarization plane of the output light from the first lens array in same direction as the second polarization direction.

* * * * *